(12) United States Patent
Nation et al.

(10) Patent No.: US 7,043,703 B2
(45) Date of Patent: May 9, 2006

(54) ARCHITECTURE AND/OR METHOD FOR USING INPUT/OUTPUT AFFINITY REGION FOR FLEXIBLE USE OF HARD MACRO I/O BUFFERS

(75) Inventors: George W. Nation, Eyota, MN (US); Gary S. Delp, Rochester, MN (US)

(73) Assignee: LSI Logic Corporation, Milpitas, CA (US)

( * ) Notice: Subject to any disclaimer, the term of this patent is extended or adjusted under 35 U.S.C. 154(b) by 227 days.

(21) Appl. No.: 10/241,317

(22) Filed: Sep. 11, 2002

(65) Prior Publication Data

US 2004/0049604 A1    Mar. 11, 2004

(51) Int. Cl.
*G06F 17/50*    (2006.01)

(52) U.S. Cl. ............... 716/1; 716/12; 438/48; 257/324

(58) Field of Classification Search ............... 716/1–18; 710/1, 305, 320

See application file for complete search history.

(56) References Cited

U.S. PATENT DOCUMENTS

| | | | |
|---|---|---|---|
| 4,656,592 A | | 4/1987 | Spaanenburg et al. |
| 5,644,496 A | * | 7/1997 | Agrawal et al. ............... 716/17 |
| 5,818,728 A | | 10/1998 | Yoeli et al. |
| 5,818,729 A | | 10/1998 | Wang et al. |
| 5,867,400 A | * | 2/1999 | El-Ghoroury et al. ......... 716/1 |
| 6,243,851 B1 | * | 6/2001 | Hwang et al. ................ 716/10 |
| 6,347,395 B1 | * | 2/2002 | Payne et al. ................... 716/18 |
| 6,459,136 B1 | | 10/2002 | Amarilio et al. |
| 6,467,010 B1 | * | 10/2002 | Pontius et al. ............... 710/305 |
| 6,543,040 B1 | * | 4/2003 | Bednar et al. ................. 716/7 |
| 6,552,410 B1 | | 4/2003 | Eaton et al. |
| 6,567,969 B1 | * | 5/2003 | Agrawal et al. ............... 716/17 |
| 6,654,946 B1 | * | 11/2003 | Eneboe et al. ................. 716/18 |
| 6,751,783 B1 | * | 6/2004 | Eneboe et al. ................. 716/2 |
| 6,792,584 B1 | * | 9/2004 | Eneboe et al. ................. 716/8 |
| 2001/0001881 A1 | * | 5/2001 | Mohan et al. ................. 716/1 |
| 2003/0110339 A1 | * | 6/2003 | Calvignac et al. ........... 710/305 |

FOREIGN PATENT DOCUMENTS

| | | |
|---|---|---|
| JP | 01202397 | 7/2001 |
| JP | 02202886 | 7/2002 |

* cited by examiner

*Primary Examiner*—Stacy A. Whitmore
*Assistant Examiner*—Binh Tat
(74) *Attorney, Agent, or Firm*—Christopher P Maiorana PC

(57) ABSTRACT

An apparatus comprising (i) one or more input/output cells, (ii) one or more hard macros and (iii) one or more input/output affinity regions. The one or more input/output affinity regions may be disposed between the one or more input/output cells and the one or more hard macros. Each of the one or more input/output affinity regions may be customized as (i) circuitry in a first mode and (ii) routing between the one or more input/output cells and the one or more hard macros in a second mode.

22 Claims, 5 Drawing Sheets

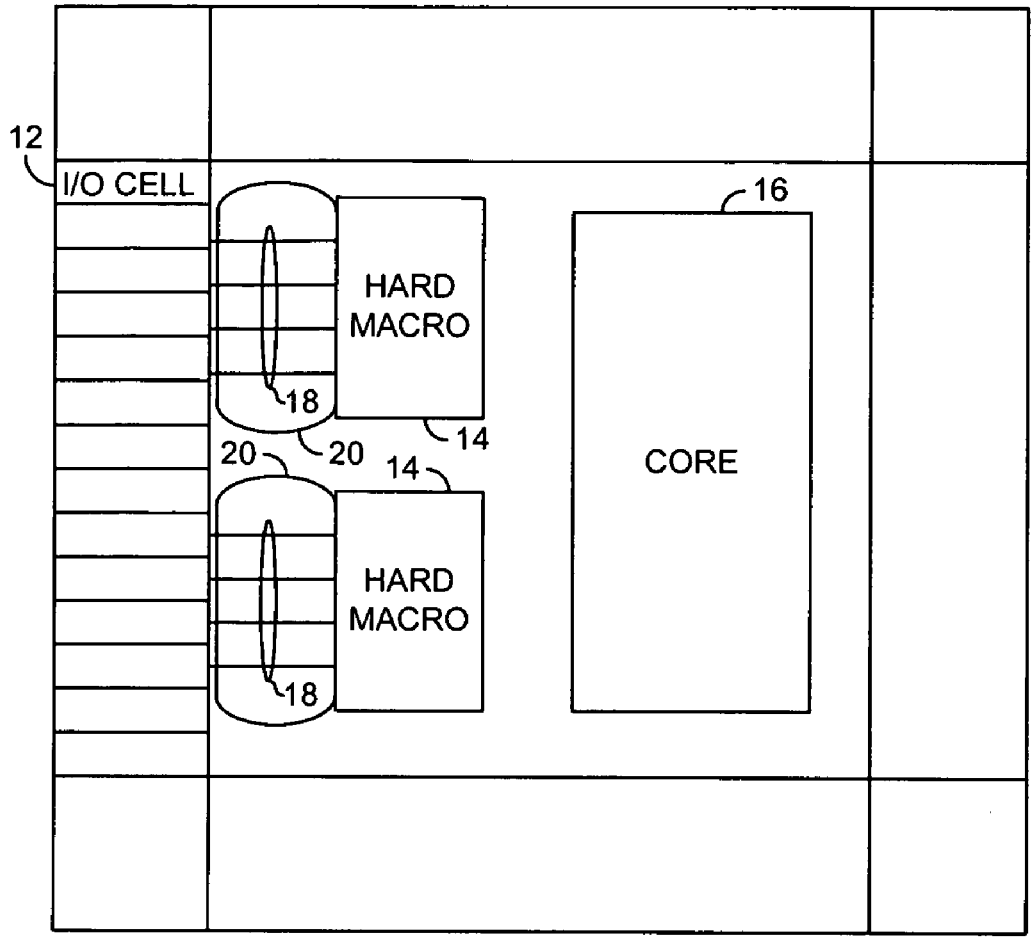
(CONVENTIONAL)
FIG. 1

SECTION A - A

SECTION B - B

SECTION C - C

ARCHITECTURE AND/OR METHOD FOR USING INPUT/OUTPUT AFFINITY REGION FOR FLEXIBLE USE OF HARD MACRO I/O BUFFERS

FIELD OF THE INVENTION

The present invention relates to a design methodology for microchip design generally and, more particularly, to an architecture and/or method for using an input/output affinity region for flexible use of hard macro I/O buffers.

BACKGROUND OF THE INVENTION

Referring to FIG. 1, a block diagram of a chip 10 is shown illustrating a conventional design architecture. The chip 10 can include a number of input/output (I/O) cells 12, a number of hard macros 14 and core circuitry 16. The I/O cells 12 provide high performance interfaces for off chip signals. The hard macros 14 provide customized and/or optimized circuits for performing specific signal processing functions to support the high performance interface protocols.

According to conventional design rules, the hard macros 14 are placed right next to, or very near to, the I/O cells 12. Typically, the hard macros 14 are wired directly to the I/O cells 12 via metal routing 18 (i.e., a bus of wires running from the hard macro 14 to the I/O cells 12). The wires 18 can run at a very high speed. A conventional design practice is to specify a prohibited area (or dead region) 20 between the hard macros 14 and the I/O cells 12 to protect the wires 18 from noise that can be coupled from surrounding logic. No other routing or logic is allowed in the prohibited areas 20 in order to maintain the integrity of signals between the hard macros 14 and the I/O cells 12.

In conventional gate array designs, when a particular chip customization does not make use of the hard macros 14, the associated I/O cells 12 are unavailable. However, the I/O cells, 12 may support many more interfaces, such as proprietary interfaces, than the interface standard supported by the hard macros 14. Because the I/O cells 12 are a valuable resource, it would be desirable to have an architecture and/or method that allows the input/output cells 12 to be used even when the hard macros 14 are not.

SUMMARY OF THE INVENTION

The present invention concerns an apparatus comprising (i) one or more input/output cells, (ii) one or more hard macros and (iii) one or more input/output affinity regions. The one or more input/output affinity regions may be disposed between the one or more input/output cells and the one or more hard macros. Each of the one or more input/output affinity regions may be customized as (i) circuitry in a first mode and (ii) routing between the one or more input/output cells and the one or more hard macros in a second mode.

The objects, features and advantages of the present invention include providing an architecture and/or method for using input/output affinity regions for flexible use of hard macros and I/O buffers that may (i) allow use of I/O buffers without the hard macro, (ii) maximize chip area available for logic, (iii) allow routing of I/O buffers to custom logic or hard macros and/or (iv) allow I/O affinity region to implement logic for conditioning signals on a chip close to the I/O buffers.

BRIEF DESCRIPTION OF THE DRAWINGS

These and other objects, features and advantages of the present invention will be apparent from the following detailed description and the appended claims and drawings in which:

FIG. 1 is a block diagram of a conventional architecture;

DETAILED DESCRIPTION OF THE PREFERRED EMBODIMENTS

Figure 2A:
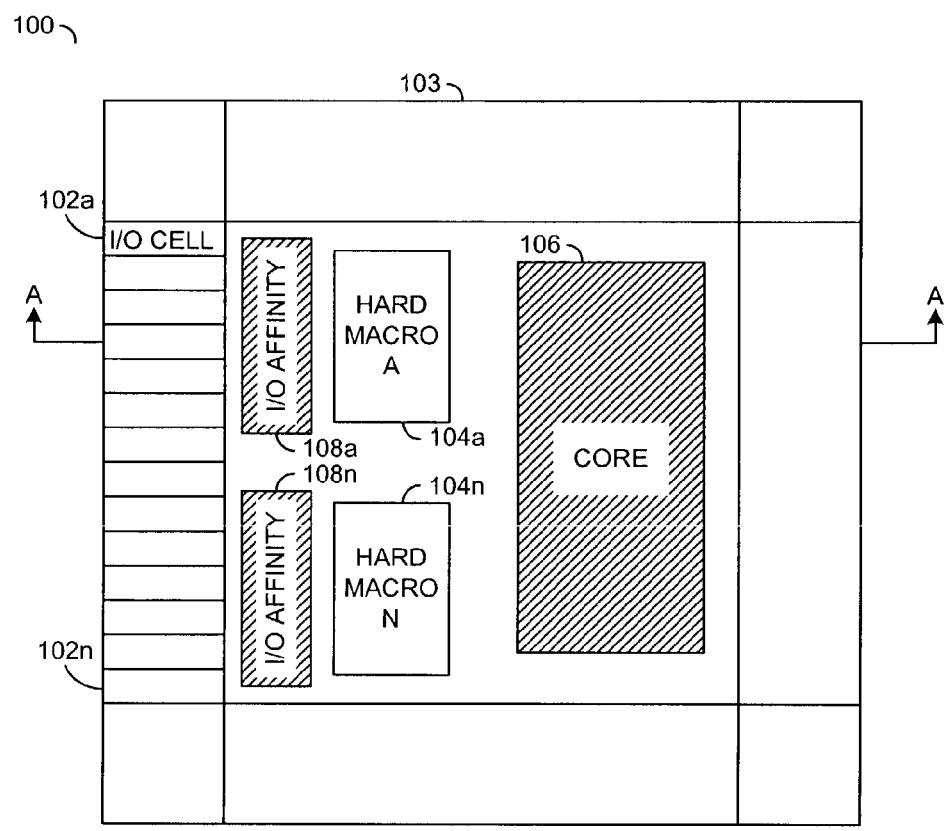
FIGS. 2A and 2B are block diagrams of an architecture in accordance with a preferred embodiment of the present invention.
Figure 2B:
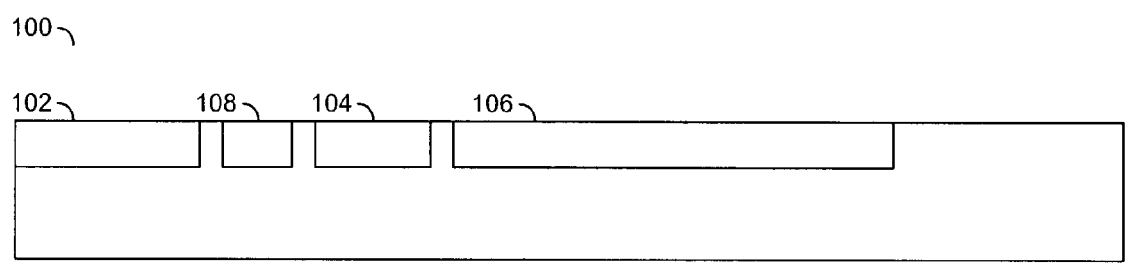

Referring to FIGS. 2A and 2B, a plan view (FIG. 2A) and a cross sectional view (FIG. 2B) of a die (or slice) 100 are shown in accordance with a preferred embodiment of the present invention. The die 100 may be representative of a number of dies on a wafer. The die 100 may comprise a number of regions 102a–n, a number of regions 104a–n, a region 106, and a number of regions 108a–n. In one example, the regions 102a–n may be implemented as I/O cells. The regions 104a–n may be implemented as hard macros. The region 106 may be implemented, in one example, as a core logic region. The regions 108a–n may be implemented as I/O affinity regions. The regions 106 and 108a–n may be implemented, in one example, with a number of A-cells.

As used herein, A-cells generally refers to an area of silicon designed to contain one or more transistors that have not yet been personalized (or configured) with metal layers. Wire layers may be added to the A-cells to make a particular logic gate or storage element. An A-cell generally comprises the diffusions for forming the parts of transistors and the contact points where wires may be attached in subsequent manufacturing steps (e.g., to power, ground, inputs and outputs). A hard macro generally comprises diffused patterns other than A-cells. For example, a hard macro may include diffused patterns of a circuit design that is customized and optimized for a particular function. In general, a hard macro may be optimized to provide better performance of a particular function than implementing the function in, for example, gate array.

The I/O cells 102a–n may be disposed, in one example, peripherally around the die 100. For example, the I/O cells 102a–n are generally implemented on the ring (or the outer perimeter) 103 of the logic on the chip 100. However, other distributions of the I/O cells 102a–n may be implemented to meet the design criteria of a particular application. In general, the I/O cells 102a–n are devoted to off chip input/output. The I/O cells 102a–n may be specially designed and may have a structure optimized for a particular input/output task. For example, the I/O cells 102a–n may be configured to provide high power drive and receive functions for driving signals off the chip 100. The I/O cells 102a–n may be configured to act as a set and be similarly timed to provide a bus of signals. In one example, the I/O cells 102a–n may be metal-customized to provide particular types of I/O circuits (e.g., buffers, drivers, etc.). For example, the I/O cells 102a–n may comprise diffused patterns that may be customized (e.g., by metal layers) for any number of I/O types or standards (e.g., LVTTL, LVDS, SSTL, HSTL, etc.).

The regions 104a–n may comprise similar and/or different hard macros. In one example, a number of slices 100a–n may be fabricated having different varieties and/or numbers of hard macros implemented in the regions 104a–n. By fabricating a variety of slices with a variety of hard macros, a wide variety of applications may be supported. For example, a particular slice may be selected for customization because the particular hard macros implemented are suitable for a customized application. In general, the regions 104a–n may be placed according to a predetermined maximum distance from the regions 102a–n.

The hard macros generally act much like an ASIC design. For example, a high speed interface may be routed into the hard macro. The hard macro may be configured to perform signal processing to correctly receive the interface and correct for any errors that may be received at the interface, according to the levels of the interface protocol. In general, hard macros may be implemented to provide a number of functions on a chip. For example, the hard macros may comprise phase locked loops (PLLs), instances of processors, memories, input/output PHY level macros, etc. Although the present invention is generally described in the context of an input/output function, the present invention may be applied accordingly to other hard macros to meet the design criteria of a particular implementation.

In general, the hard macros convert the interface signals to signals compatible with the core logic 106. For example, an interface on an output side of the hard macro may be coupled into the core logic and operate in response to a clock of the core logic or at a clock rate of the core logic. The clock rate of the core logic may be lower than the off chip clock rate. In one example, the hard macro may provide an interface to the core logic that may be wider and/or slower than the interface provided to the I/O cells.

Figure 3A:
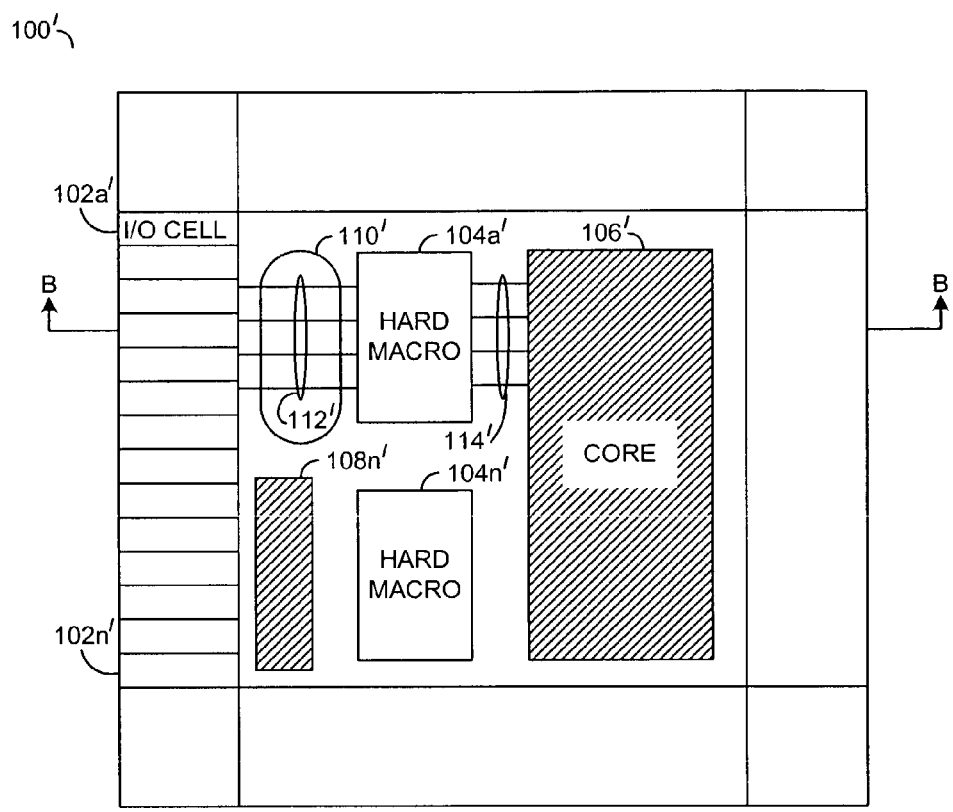
FIGS. 3A and 3B are block diagrams of a customized slice in accordance with a preferred embodiment of the present invention.
Figure 4A:
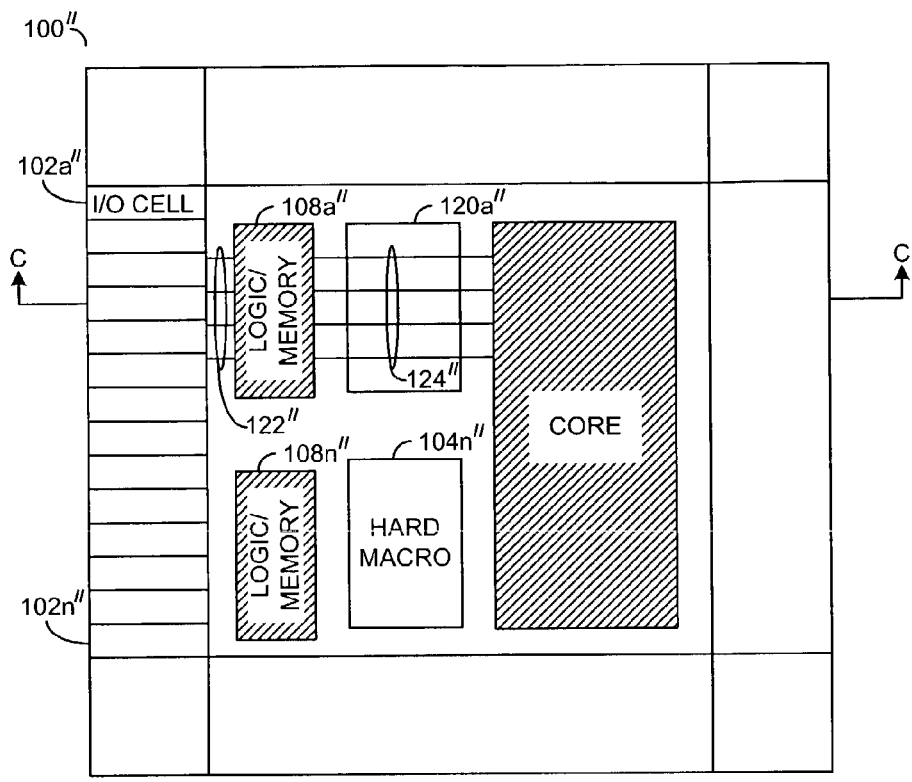
FIGS. 4A and 4B are block diagrams of another customized slice in accordance with a preferred embodiment of the present invention.

The region 106 and the regions 108a–n may be implemented, in one example, as gate array circuitry. Alternatively, the region 106 and the regions 108a–n may be implemented with standard cells for an application specific integrated circuit (ASIC). The circuit 100 is shown with I/O cells 102 and hard macros 104 along one side as an example to simplify the description. In general, I/O cells 102, hard macros 104 and I/O affinity regions 108 may be placed on all four sides of a die (e.g., surrounding the core region 106). The example circuits as shown in FIGS. 2a, 3a and 4a generally provide a representation of a single side of a four-sided die with I/O cells, hard macros, I/O affinity regions, etc. on all four sides.

In general, chips are built from the bottom up. During a manufacturing process, layers of diffused patterns and wires may be deposited on a wafer. The first layers that are laid down generally create, for example, wells or trenches. The diffused patterns are generally built up to form transistor structures (e.g., wells, sources, drains, channels, etc.). The transistor structures are generally inert until wired to a power supply and ground. The transistors may be wired to each other to form logic gates, memory cells, or other structures of a particular chip design.

The first layers that are laid down in the manufacturing process of a chip are generally the semiconductor or semi-conducting layers that form the transistors. On top of the first layers, layers of wires (or metalizations) are laid down that connect the transistors together to form the logic gates. Further layers of wires may be deposited to connect the logic gates to one another to form more complicated logic functions (e.g., processors, adders, multiplexers, etc.).

When a chip is fabricated in the foundry, a first number layers are generally produced in the semiconducting material (e.g., silicon) by doping the material to act as different parts of transistors. However, only diffusions for the transistors (or A-cells) are generally present until the first metal layers are placed and actually hook-up the transistors to power and ground. Further metal layers generally provide the particular interconnection within a very small group of transistors to form a fundamental logic gate like an AND gate, a NAND gate, an OR gate, an XOR gate, or a storage element (e.g., a flip-flop). The logic functions generally comprise two or more transistors.

In general, the A-cells may be, in one example, building blocks for logic and/or storage elements. For example, one way of designing a chip that performs logic and storage functions may be to lay down numerous A-cells row after row, column after column. A large area of the chip may be devoted to nothing but A-cells. The A-cells may be personalized (or configured) in subsequent production steps (e.g., depositing of metal layers) to provide particular logic functions. The logic functions may be further wired together (e.g., a gate array design).

Another design process, generally called standard cell or application specific integrated circuit (ASIC) design in the industry today, generally involves placing cells that have been customized to be particular logic cells (e.g., an A-cell that already has metal layers defined to be a NAND gate or a flip-flop and/or an underlying transistor design featuring sizes that may be different from one logic cell to a next). Such a design process may provide a very customized area of standard cells where each standard cell has already been optimized to a particular kind of gate. The present invention may also be applied to such design processes.

In one example, the regions 106 and 108a–n may comprise a number of A-cells. When an associated hard macro 104a–n is used, the A-cells laid down in the respective region 108a–n generally remain uncustomized (e.g., no logic is placed in or other signals routed into the respective region 108a–n to maintain the design rules of the particular hard macro). However, when the hard macro 104a–n is not used, the A-cells generally enable additional logic and/or storage to be implemented on the slice.

Figure 3B:
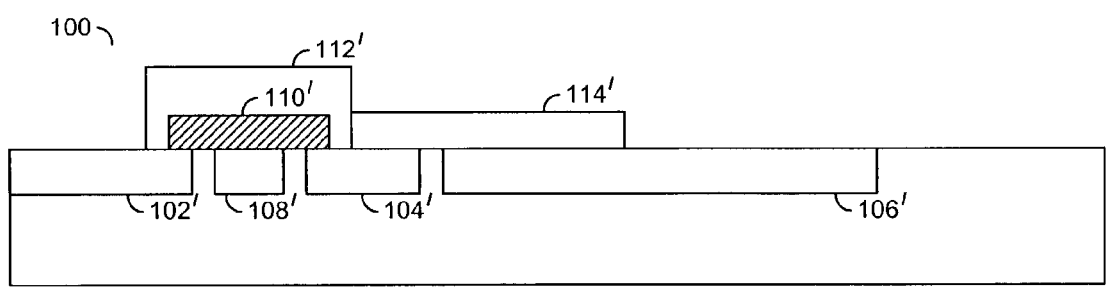

Referring to FIGS. 3A and 3B, a plan view (FIG. 3A) and a schematic cross-sectional view of example insulating and metal routing layers (FIG. 3B) of an example customized die 100' are shown in accordance with a preferred embodiment of the present invention. The die 100' may be implemented similarly to the die 100. When one or more of the I/O cells 102a–n' are to be coupled to a respective hard macro 104a–n', an insulating layer 110' may be deposited over the respective I/O affinity region 108a–n'. Routing 112' may be placed over the insulating layer 110' between the I/O cells 102a–n' and the respective hard macro 104a–n'. In the same or a different metal layer, routing 114' may be placed, for example, from the hard macro 104a' to the region 106'.

Figure 4B:
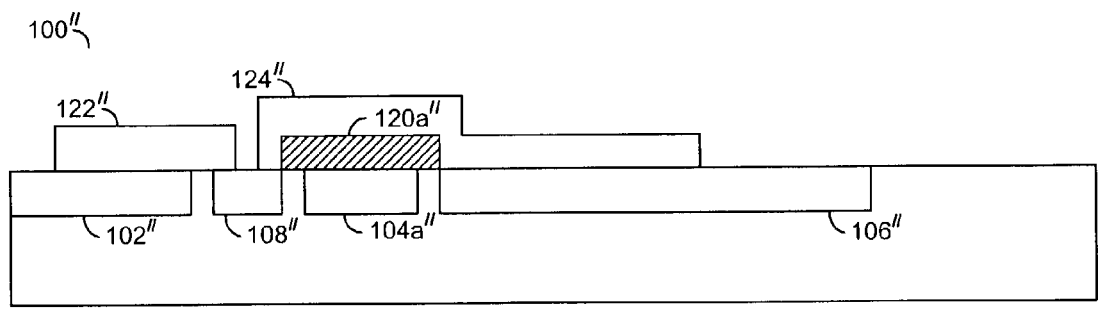

Referring to FIGS. 4A and 4B, a plan view (FIG. 4A) and a schematic cross-sectional view of example insulating and metal-routing layers (FIG. 4B) of another example customized die 100" are shown in accordance with a preferred embodiment of the present invention. The die 100" may be implemented similarly to the die 100. For those instances where the I/O cells 102a–n" are to be used but one or more of the associated hard macros 104a–n" are not, the respective region 108 may be configured as an I/O affinity region where gate array logic may be placed and routed. The respective region 104a–n" is generally covered by one or more insulating layers 120a" and not connected to the I/O cells 102a–n". In one example, the respective hard macro area 104a–n" may not be usable for gate array logic due to incompatibility between the diffused area and the A-cells presumed by the gate array library. However, one or more metal layers 124" may be placed over the respective region 104a–n" to provide gate array routing. A contact layer and a lower metal layer of the die 100" may be configured to physically disconnect the respective one of the diffused regions 104a–n". Alternatively, the respective one of the diffused regions 104a–n" may be functionally re-customized as capacitors.

Figure 5:
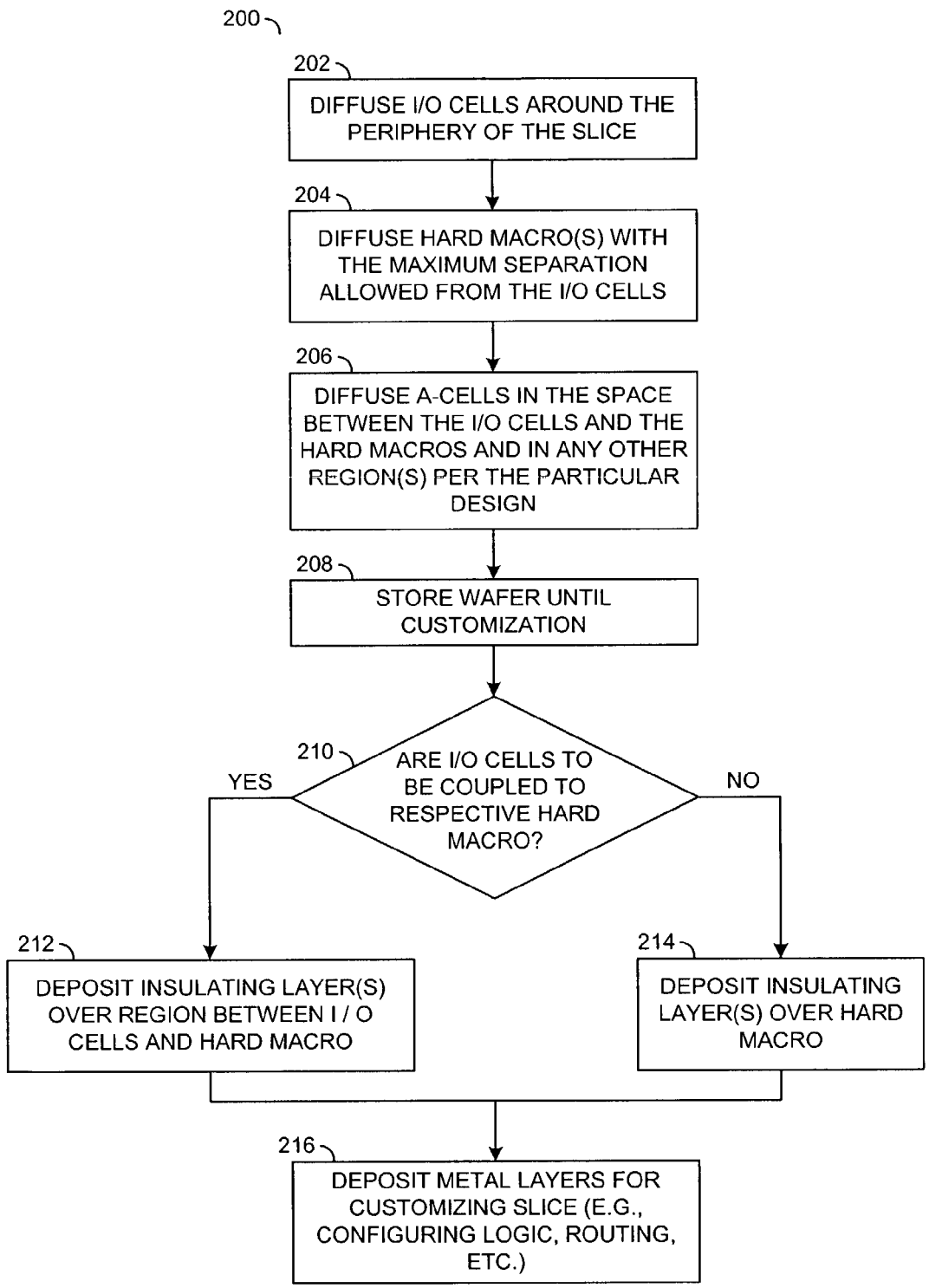
FIG. 5 is a flow diagram of a fabrication process in accordance with a preferred embodiment of the present invention.

Referring to FIG. 5, a flow diagram 200 is shown illustrating an example fabrication process in accordance with the present invention. The process of fabricating one or more dies (or slices) on a wafer generally comprises the steps of diffusing I/O cells on the slice (e.g., the block 202), diffusing one or more hard macros separated from the I/O cells by a predetermined maximum distance (e.g., the block 204), and diffusing a number of A-cells in an I/O affinity region disposed between one or more of the I/O cells and a respective hard macro (e.g., the block 206).

When the structures have been built up on the wafer, the wafer may be stored for later customization (e.g., the block 208). When a slice is to be customized (e.g., one or more metal layers deposited to configure the function of the slice), a determination is made whether each hard macro will be coupled to respective I/O cells (e.g., the block 210). When a hard macro is to be coupled to the respective I/O cells, the respective I/O affinity region is generally covered over by deposition of an insulating layer (e.g., the block 212). When the hard macro is not going to be coupled to the I/O cells, an insulating layer is generally deposited over the hard macro (e.g., the block 214). The slice may be customized by the deposition of one or more metal layers during subsequent process steps (e.g., the block 216).

The present invention may be applied to A-cell designs, gate array designs, a custom ASIC design and/or a standard cell design. Both the A-cells and the standard cells generally provide for customizing a chip (or slice) after the diffused layers of the chip design have already been defined. For example, a first metal pattern may be placed to provide a function x and a second metal pattern may be placed to provide a function y on chips with the same design up to the diffused layers. The metal layers generally define the function of the chip. The present invention generally provides, in one example, fixed diffused layers that may be customized with metal layers to provide a complete chip design.

Additional hard macros may be implemented elsewhere on the chip 100 that may be used by the core logic 106. In a preferred embodiment, the core logic 106 is generally implemented as a gate array on A-cells. The present invention generally provides an I/O affinity region disposed between one or more I/O cells and a respective hard macro.

The present invention generally provides a wafer having a substrate with a number of diffused layers (e.g., the non-metal-customized diffused layers containing A-cells, I/O cells and the underlying transistor patterns for the hard macros are generally built up in the diffused layers). The manufacturing (or fabrication) process for the substrate may be stopped and the wafers stored (e.g., put on a shelf) for future customization.

One of the overall advantages of gate array style design versus the standard cell design is that most of the die or most of the chip may be manufactured and set on a shelf. In general, the wafer may go through many of the processing steps and be stored when the only processing steps left are the metal customization and the final testing of the die; dicing the die off the wafer and mounting the die in a chip package. One of the advantages of gate array design is that a gate array design based on partially finished wafers may be manufactured faster and take fewer steps. Different customizations of the slice may use the A-cells differently.

When the hard macro is to be coupled to the I/O cells, a metal connection between the I/O cells and the hard macro is generally placed over the respective I/O affinity region. The A-cells of the respective I/O affinity region are generally not used for logic functions and, therefore, are not generally customized. Instead, the I/O affinity regions associated with the hard macro are generally covered by an insulating layer. By covering over the I/O affinity region, the rules (or restrictions) for the hard macro layout may be met.

When a high speed interface is implemented, the wires that are going from the hard macro to the I/O cells are generally running at a very high speed. The wires need to be protected so that noise is not coupled into the wires from surrounding logic so that the voltage stays very stable (e.g., the wires are shielded). One way of shielding structures in logic is not to put anything near the structures. For example, when a slice is customized to use the hard macro (e.g., to design high speed interface), the I/O affinity region is generally not personalized (e.g., the I/O affinity region is covered over).

When the hard macro is not used or not coupled to the I/O cells that are directly adjacent, the hard macro may be covered over or insulated over at the very lowest levels of metal. When the hard macro is covered over, the hard macro generally forms an inert piece of logic or an inert area of the chip. However, the metal layers above the hard macro are generally available for routing for other logic.

The A-cells may be configured for anything like logic or storage. The A-cells may be characterized in a subsequent manufacturing step the metal layers deposited to meet design criteria of a particular application. The A-cells of the I/O affinity region 108a–n may be used for other logic besides to hook up to the I/O cells 102a–n. When a storage block is desirable, the I/O affinity region may be metal-customized for storage (e.g., a memory register, etc.). The present invention may provide extra space for more logic in the I/O affinity regions when the regions are not used for the direct support of I/O connectivity. When an I/O capability other than that provided by the hard macro is desirable, the I/O affinity region may be configured to provide the external I/O protocol logic.

In practice, an interface implemented in the I/O affinity regions may not be able to run as fast as the I/O interface supported with the hard macro. However, the I/O affinity region may allow a number of different types of interfaces to be implemented with the same I/O cells. The hard macro generally provides support for the extreme interfaces. However, a number of different types of protocols (e.g., SP14-02.0, SF14-01.0, XSBI, IEEE LVDS 1496.3, etc.) may be supported by custom logic implemented in the I/O affinity regions. The A-cells may allow a more generic I/O interface whereas the hard macro generally provides a dedicated well defined or specifically defined interface.

The present invention generally provides full use of the I/O cells of a slice even though a respective hard macro is effectively disabled (or passivated). For example, with the conventional dead region, when a customer wants to use the I/O cells associated with a hard macro for a protocol other than that supported by the hard macro, the customer is not able to place logic anywhere near the I/O cells because the I/O affinity region and the hard macro area are dead regions. Although routing to the I/O cells is still possible, the logic is very far away. Because the logic is far away, either the interface is generally slow or the electrical and timing characteristics of the interface are generally compromised due to the long on chip wires.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   one or more input/output cells;
   one or more hard macros;
   one or more input/output affinity regions disposed between said one or more input/output cells and said one or more hard macros, wherein each of said one or more input/output affinity regions comprises one or more diffused layers that can be customized to form circuitry; and
   an insulating layer deposited (i) over one of said one or more hard macros in a first mode and (ii) over one of said one or more input/output affinity regions in a second mode, wherein said insulating layer separates the underlying hard macro or input/output affinity region from one or more layers above said insulating layer.

2. The apparatus according to claim 1, wherein said one or more input/output cells are disposed on a periphery of a semiconductor die.

3. The apparatus according to claim 1, wherein said one or more input/output affinity regions comprise diffusion patterns that are customizable as said circuitry.

4. The apparatus according to claim 3, wherein said one or more input/output affinity regions comprise diffusion patterns that are customizable as logic circuitry.

5. The apparatus according to claim 3, wherein said one or more input/output affinity regions comprise diffusion patterns that are customizable as storage circuitry.

6. The apparatus according to claim 1, wherein said one or more input/output affinity regions are customized in said first mode by deposition of one or more metal layers.

7. The apparatus according to claim 1, wherein said insulating layer converts the underlying hard macro or input/output affinity region into an inert area.

8. The apparatus according to claim 1, wherein:
   one or more metal layers are (i) placed over said insulating layer in said second mode and (ii) configured to connect one of said one or more input/output cells to said one of said one or more hard macros.

9. The apparatus according to claim 1, wherein the hard macro covered by said insulating layer is re-customized as capacitors.

10. The apparatus according to claim 1, wherein said input/output cells are customizable to support a plurality of input/output types and standards with one or more metal layers.

11. An architecture for an integrated circuit comprising:
    means for receiving signals from and presenting signals to external circuitry;
    means for communicating said signals to and from core circuitry; and
    means for implementing one or more input/output affinity regions disposed between said receiving means and said communicating means, wherein each of said input/output affinity regions is (i) customizable as circuitry in a first mode and (ii) insulated from routing between said receiving means and said communicating means in a second mode.

12. A method for using input/output affinity regions for flexible use of hard macro input/output buffers comprising the steps of:
    providing one or more input/output cells;
    providing one or more hard macros; and
    providing one or more input/output affinity regions disposed between said one or more input/output cells and said one or more hard macros, wherein each of said one or more input/output affinity regions comprises one or more diffused layers that can be customized to form circuitry;
    depositing an insulating layer (i) over one of said one or more hard macros in a first mode and (ii) over one of said one or more input/output affinity regions in a second mode, wherein said insulating layer insulates the underlying hard macro or input/output affinity region from one or more layers above said insulating layer.

13. The method according to claim 12, further comprising the step of:
    depositing one or more metal layers in said second mode, wherein said one or more metal layer are (i) deposited over said insulating layer deposited over said one of said one or more input/output affinity regions and (ii) configured to connect said one or more input/output cells to said one of said one or more hard macros.

14. The method according to claim 12, further comprising the step of:
    depositing one or more metal layers over said one or more diffused layers of said input/output affinity regions, wherein said one or more metal layers are configured to customize said one or more diffused layers to form said circuitry.

15. The method according to claim 14, wherein said one or more metal layers over said one or more input/output affinity regions are configured to implement logic circuitry.

16. The method according to claim 14, wherein said one or more metal layers over said one or more input/output affinity regions are configured to implement storage circuitry.

17. The method according to claim 12, wherein the step of providing one or more input/output affinity regions comprises the step of:
    depositing one or more diffused patterns customizable as transistors.

18. The method according to claim 12, wherein the step of providing one or more input/output affinity regions comprises the step of:
    depositing one or more A-cells.

19. The method according to claim 12, further comprising the step of:
    depositing one or more metal layers over said input/output cells.

20. The method according to claim 12, further comprising the step of:
    customizing a partially finished wafer comprising said one or more input/output cells, said one or more hard macros and said one or more input/output affinity regions by (i) re-configuring at least one of said one or more hardmacros as capacitors, (ii) depositing an insulating layer over said at least one hardmacro and depositing one or more metal layers.

21. The method according to claim 18, further comprising the steps of:
  depositing one or more metal layers in said one or more input/output affinity regions, said one or more metal layers configured to customize said one or more A-cells as one or more structures selected from the group consisting of a transistor, a gate, a storage element, a group of transistors configured to provide a logic function and a gate array design.

22. The apparatus according to claim 3, wherein said diffusion patterns are:
  customizable, in said first mode, as one or more structures selected from the group consisting of transistors, gates, storage elements, groups of transistors configured to provide logic functions and gate array designs, by deposition of one or more metal layers.

* * * * *